Figure 1:
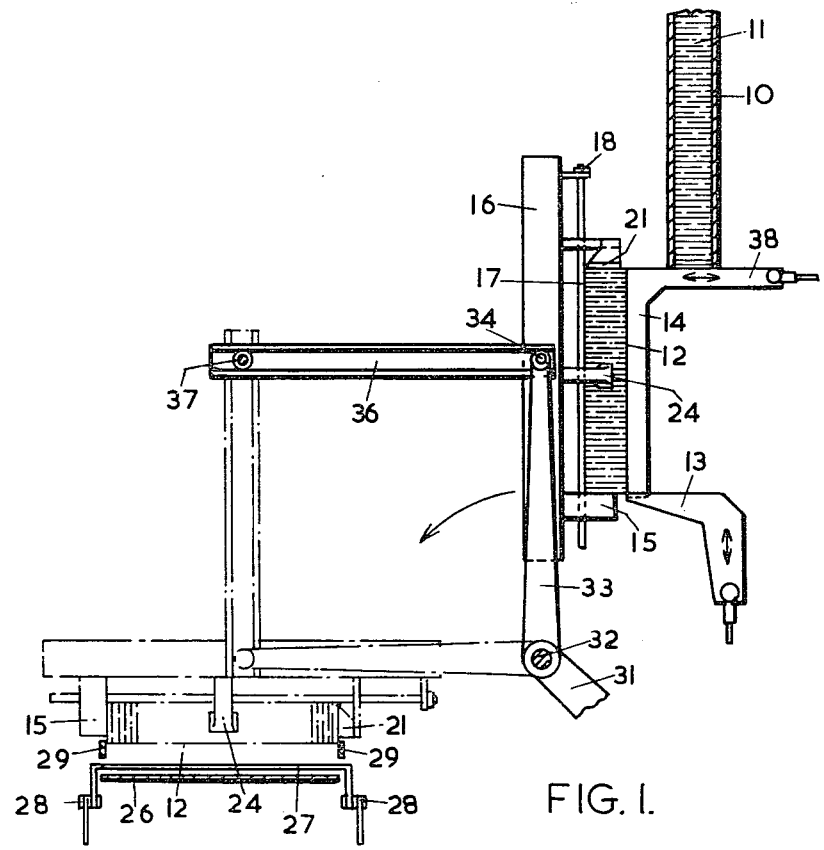

United States Patent [19]

Blakelock

[11] 4,364,467
[45] Dec. 21, 1982

[54] APPARATUS FOR HANDLING BISCUITS

[75] Inventor: Wallace J. Blakelock, Leeds, England

[73] Assignee: Baker Perkins Holdings Limited, Peterborough, England

[21] Appl. No.: 220,278

[22] Filed: Dec. 29, 1980

[51] Int. Cl.³ .................. B65G 25/00; B65G 47/24
[52] U.S. Cl. ............................ 198/486; 198/409; 198/487
[58] Field of Search .............. 198/486, 409, 487, 412, 198/406, 379, 418, 429, 433; 414/783, 739–741

[56] References Cited

U.S. PATENT DOCUMENTS

| | | | |
|---|---|---|---|
| 3,085,501 | 4/1963 | Wimmer | 198/486 |
| 3,648,821 | 3/1972 | Rudolph | 198/412 |
| 3,661,242 | 5/1972 | Clancy | 198/412 |
| 3,712,480 | 1/1973 | Houssa | 414/783 |
| 3,909,056 | 9/1975 | Dume | 294/67 BB |
| 4,178,119 | 12/1979 | Busch | 414/783 |
| 4,197,046 | 4/1980 | Shank | 198/486 |

FOREIGN PATENT DOCUMENTS 1379884 12/1971 United Kingdom .
469642  7/1975 U.S.S.R. ........................... 198/486

OTHER PUBLICATIONS

"Coupler for Remote Manipulators"–NASA Tech. Briefs–Fall 1979.

Primary Examiner—John J. Love
Assistant Examiner—Brian Bond
Attorney, Agent, or Firm—Watson, Cole, Grindle & Watson

[57] ABSTRACT

Apparatus for transferring batches of biscuits (11) in succession from a magazine (10) to the infeed conveyor (28) of a wrapping machine which includes a transfer unit which includes a platform (15), a support (17) for the batch (12) of biscuits to be transferred, a jaw (21) and side clamps (24). After transfer of a batch of biscuits to the transfer unit at a loading station, the jaw and the clamps are applied to the batch. The transfer unit then moves to a discharge position at which the jaw and the clamps are withdrawn to allow the biscuits to fall onto a deadplate (26).

4 Claims, 4 Drawing Figures

APPARATUS FOR HANDLING BISCUITS

British Pat. No. 1379884 describes apparatus for delivering successive batches of biscuits from a magazine, which supports a vertical column of superposed biscuits, to a container box which is closed on all sides except that at which the biscuits enter and is provided with hinged flaps which afterwards close partially across the open side of the box to prevent the biscuits falling out. In practical operation of this apparatus the box is moved, after entry of the biscuits and closure of the flaps, to a position in which its open side faces downwardly and is disposed above the infeed conveyor of a wrapping machine, whereafter the flaps are opened to discharge the biscuits onto the conveyor, to be advanced, standing on edge, along a deadplate by flights of the conveyor to the wrapping machine. Also, in practice, several magazines are provided side by side, each with an associated container box so that several batches of biscuits, each from a separate magazine, are delivered simultaneously to the infeed conveyor.

Since the thickness of the biscuits in a magazine tends to vary as the result of different conditions prevailing in the baking oven, it is not possible to ensure that each batch of biscuits will always contain precisely the same number of biscuits and from time to time a batch may contain one less than the normal number of biscuits. The biscuits do not, therefore, completely fill the space within the box. Furthermore the box is required to move down between side guides of the infeed conveyor so that the distance between these guides must exceed the length of the batch of biscuits not only by the excess space within the box but also by twice the wall thickness of the box.

Accordingly difficulty can arise in depositing the biscuits on the infeed conveyor in a truly vertical position, so as to give a square ended batch which can be efficiently wrapped. If the biscuits drop from the box in an inclined position it is very difficult to reorient them to the vertical because of the friction between the biscuits. The tendency of the biscuits to assume an inclined position arises from the fact that it is necessary for the container box to pass between the side guides of the infeed conveyor before it deposits the biscuits. This allows loosely fitting biscuits to spread out to fill the space taken by the end walls of the container box and the working clearance between the end walls and the side guides, which is normally about ⅛" in total.

The invention provides apparatus for transferring to the infeed conveyor of a wrapping machine successive batches of biscuits from a magazine containing a substantially vertical stack of biscuits, comprising a transfer unit which is movable from a loading position adjacent to the magazine to a discharge position above the infeed conveyor, means for transferring the batches of biscuits laterally from the magazine to the transfer unit, the transfer unit including a frame constituted by a platform which extends horizontally in the loading position to support the bottom of each batch, a support which extends upwardly from the base in the loading position to engage the edges of the biscuits in each transferred batch, a jaw movable into engagement with the top of the batch at the loading position to apply resilient pressure thereto, and grippers movable to engage opposite sides of the batch in the central region thereof, means for moving the transfer unit, after engagement of the jaw and the grippers with the batch, to the discharge position in which the support extends horizontally above the biscuits and means for then withdrawing the jaw and the grippers simultaneously from the batch to allow the batch to fall onto the infeed conveyor.

The grippers enable the unit to maintain a firm grip on the biscuits during their transfer from the loading to the discharge position and prevent any tendency for the batch to become unstable and buckle. Such buckling is particularly prevalent when the batch is long and the biscuits forming the batch are of the "cookie" type which are usually dome shaped.

Preferably the jaw and the grippers are urged by springs toward the biscuits and are retracted positively by power-actuated means to discharge the biscuits.

The tendency of the biscuits to assume an inclined position after discharge is considerably reduced. One side guide of the infeed conveyor can be aligned with the position occupied by the inner face of the platform in the discharge position and the other side guide can be aligned with the position of the inner face of the jaw when the latter is engaging a batch of maximum length. Accordingly the spacing of the side guides will never exceed the length of the longest batch by more than a very small clearance.

A further advantage of the absence of flaps is that in an assembly including several magazines and associated transfer units the transfer units can be situated closer together in the lengthwise direction of the infeed conveyor. This enables the pitch of the flights to be reduced so that the speed of travel of the conveyor required to supply the wrapping machine with a given number of batches per minute can be reduced.

Figure 4:
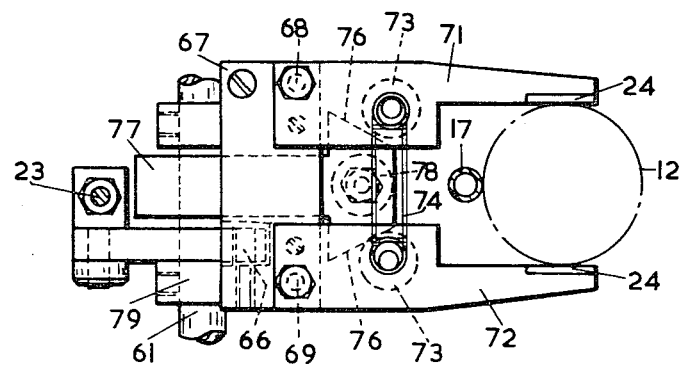
Figure 2:
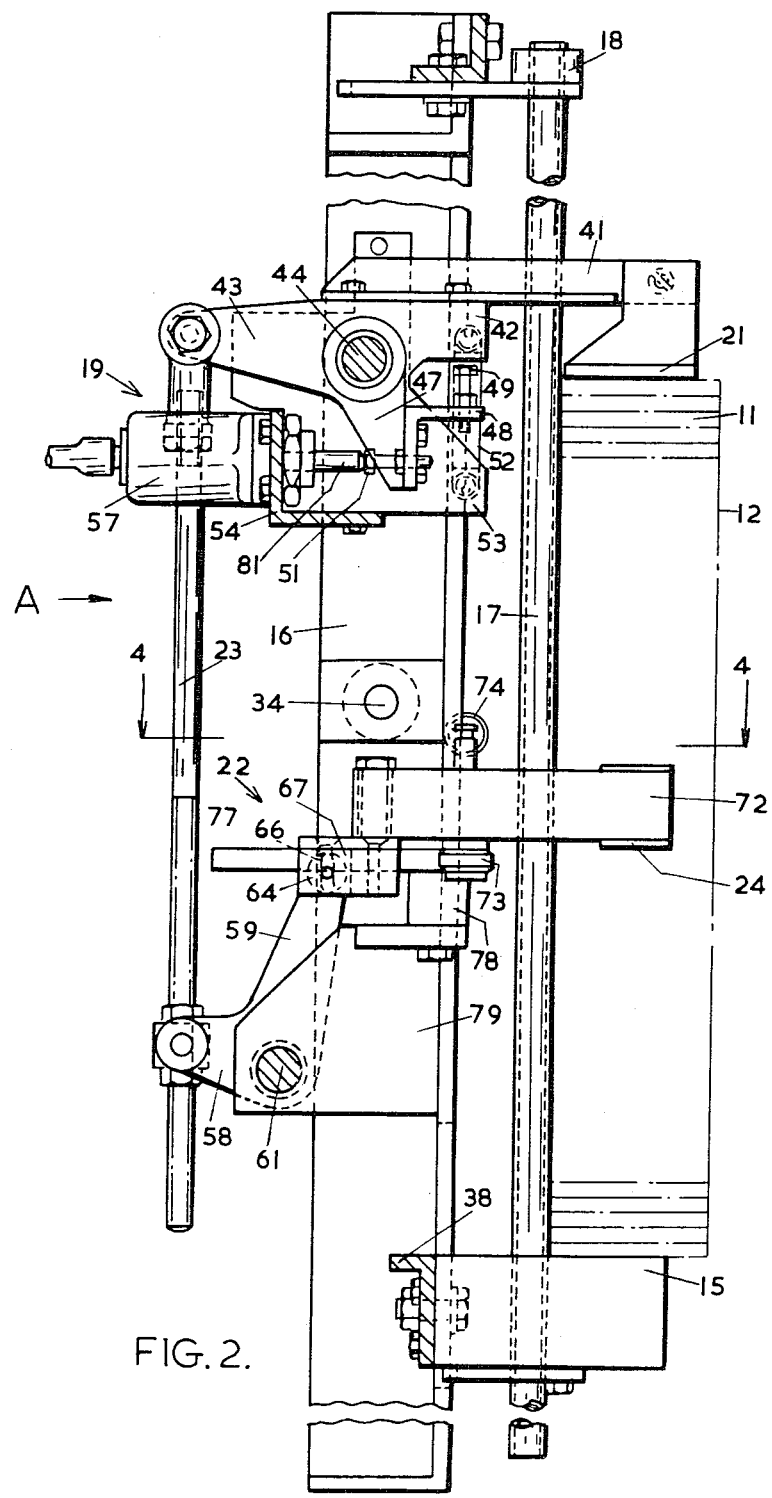
Figure 3:
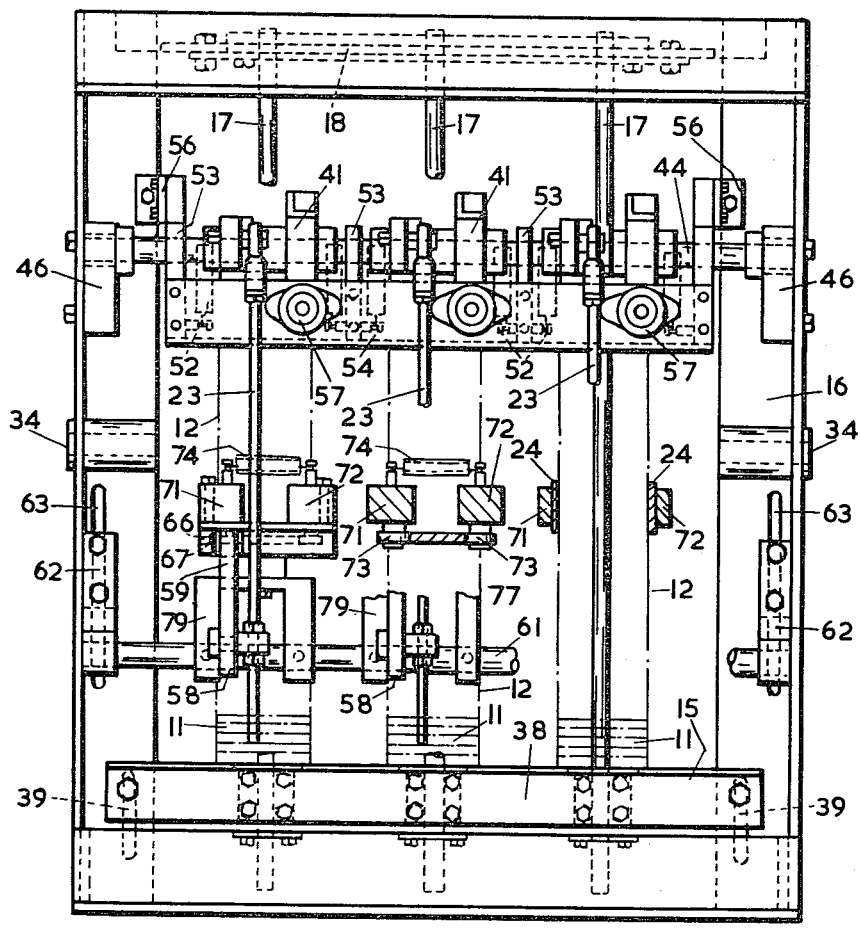

An embodiment of apparatus constructed in accordance with the invention will now be described in greater detail, by way of example, with reference to the accompanying drawings, in which:

FIG. 1 is a diagrammatic elevation showing the general arrangement of the apparatus, FIG. 2 is a sectional elevation, drawn to a larger scale, of part of the apparatus shown in FIG. 1, FIG. 3 is a front elevation taken in the direction of the arrow A in FIG. 2, and FIG. 4 is a part sectional view taken on the line 4—4 in FIG. 2.

As shown in FIGS. 1 and 2, biscuits to be batched are supplied by means (not shown) to a series of magazines 10 (in the present example three magazines) each of which supports a vertical column of superposed biscuits 11 and from the bottom of which successive batches 12 of a predetermined length are removed. As more fully described in the above-mentioned British Pat. No. 1379884 a movable support 13 is positioned below each magazine 10 and is operated, at intervals, to descend by an amount equal to the length of the batch 12. The support 13 moves downwardly at substantially the same rate as the biscuits 11 are fed to the magazine 10 and upon completion of this downward movement a pusher 14 is operated to slide the batch 12 across the surface of the support 13 on to a platform 15 mounted on a frame 16. The pusher 14 moves the batch along the platform 15 until it engages a support constituted by a tube 17 mounted at one end in the platform 15 and at the other end in a bracket 18 mounted in the frame 16.

Upon completion of the transfer stroke of the pusher 14 a mechanism, generally indicated by the reference numeral 19 (FIG. 2), mounted on the frame 16 is operated to pivot a jaw 21 into engagement with the upper surface of the batch to clamp it to the platform 15.

Simultaneously with this movement a further mechanism, generally indicated by the reference numeral 22, which is also mounted in the frame 16 and is connected to the mechanism 19 by a connecting rod 23, causes a pair of grippers 24 to move into engagement with opposite sides of the batch 12 at approximately the centre of the batch in the longitudinal direction.

When the batch 12 has thus been securely clamped and centrally supported, the frame 16 is moved to the position shown in chain-dotted lines in FIG. 1, whereupon the jaw 21 and the grippers 24 are released to allow the batch to fall on to a dead plate 26, along which successive batches 12 are transferred by a series of spaced pusher bars 27 mounted on a chain conveyor 28 to a wrapping machine (not shown). During this movement the ends of the batches 12 are supported by fixed side guides 29.

As will be seen from FIG. 1, in the discharge position the inner face of the platform 15 occupies a datum position aligned with the inner face of the left hand guide 29 while the inner face of the jaw 21 is spaced inwardly of the inner face of the other guide by a small distance only dependent upon the length of the batch.

The mechanism for so moving the frame 16 to transfer the batches to the conveyor 28 is as described in the aforesaid Pat. No. 1379884 and requires no detailed description. It is operated by a cam-controlled arm 31 secured to a shaft 32, to which is fixed a pair of arms 33 on which the frame 16 is pivotally mounted at 34. In operation, the arm 31 is pivoted in an anticlockwise direction to rotate the arms 33 in the direction of the arrow in FIG. 1. As this occurs a channel member 36 extending from the frame 16 slides along a fixed guide stud 37. Initially the free end of the member 36 moves to the left and upwardly in relation to the stud 37 until the member 36 is in line with the arms 33, whereafter this relative movement is reversed, the member 36 moving downwardly in relation to the stud 37 until the frame 16 takes up the chain-dotted position previously referred to.

During this operation the pusher 14 initially remains in its forward position, i.e. the position shown in FIG. 1. In this position a tailpiece 38 on the pusher 14 supports the column of biscuits 11 in the magazine 10. As soon as the batch 12 has been transferred on to the platform 15 the support 13 starts to rise and, to enable this to occur while the pusher 14 is in its forward position, the support 15 and the pusher 14 are each constituted by a series of spaced plates of the shape shown in FIG. 1 which alternate with one another so that the two components interleave and each is capable of its own movement without interference by the other. As the support 13 approaches its uppermost position the pusher 14 starts to retract and completes this rearward movement just as the support 13 comes into position to take over the support of the column of biscuits 11 in the magazine 10. As soon as this occurs the support 13 starts to descend once again and the above-described cycle is then repeated.

As mentioned above, the apparatus illustrated is designed to accommodate three batches 12 of biscuits 11 and as the mechanism for clamping and centrally supporting each batch is identical, only one such mechanism will be described. As shown in FIG. 3, the platform 15 has apertures to allow passage of the tubes 17 and extends across the whole width of the frame 16, being secured to an angle-piece 38, which is adjustably mounted to cater for various batch lengths in slots 39 formed in the sides of the frame 16. Each jaw 21 is secured to an arm 41 attached to one arm 42 (FIG. 2) of a two-armed lever 42, 43 pivotally mounted on a shaft 44 mounted in brackets 46 attached to the frame 16. Also pivotally mounted on the shaft 44 is an arm 47 (FIG. 2), to which is attached an angle plate 48 the faces of which carry respective tappets 49 and 51. Two springs 52 are attached between each arm 42 and a plate 53, which is secured to an angle bracket 54 secured to the frame 16 by brackets 56 (FIG. 3). The angle bracket 54 supports a pneumatic cylinder 57, which is operated through a valve (not shown) to control the operation of the mechanism 19.

The rod 23 is attached at its opposite ends to the arm 43 and to one arm 58 of a two-armed lever 58, 59 pivotally mounted on a shaft 61 secured in brackets 62 adjustably mounted in slots 63 formed in the sides of the frame 16. The arm 59 has a slot 64 which engages a pin 66 secured to a slide block 67, to which are pivoted at 68 and 69 (FIG. 4) arms 71 and 72 respectively, which carry the grippers 24. Each arm 71 and 72 carries a rotatably mounted roller 73 urged by a spring 74 extending between the arms 71 and 72 into contact with one of a pair of inclined tracks 76 formed on a bar 77 which extends through the slide block 67 and which is secured to an extension 78 of a bracket 79 fixed to the shaft 61.

Each time a batch 12 of biscuits is fed on to the platform 15 as described above air is cut off from the cylinder 57 which allows the springs 52 to pivot the arm 42 in a clockwise direction as seen in FIG. 2 to move the jaw 21 into engagement with the upper surface of the batch 12 to clamp it on to the platform 15. The pivotal movement of the lever 42, 43 is transmitted through the rod 23 to the lever 58, 59 which also pivots in a clockwise direction to move the slide block 67 to the right on the slide bar 77, causing the rollers 73 to travel down the tracks 76 to allow the grippers 24 under the action of the spring 74 to engage the sides of the batch 12. With the batch 12 thus clamped the frame 16 transfers the batch into position above the conveyor 28. Air is then supplied to the cylinder 57 which actuates a piston 81 (FIG. 2) to engage the tappet 51 which in turn pivots the arm 47 and hence the angle plate 48 to move the tappet 49 into engagement with the arm 42 which pivots in an anti-clockwise direction to release the clamping action of the jaw 21. The pivotal movement of the arm 42 is transmitted through the rod 23 to pivot the arm 59 in an anti-clockwise direction which moves the slide block 67 to cause the rollers 73 to travel up the tracks 76. This pivots the arms 71 and 72 against the action of the spring 74 to release the clamping action of the centre grippers 24. Upon release of the batch 12, it drops on to the dead plate 26 from which it is transferred to the wrapping machine by a pusher bar 27. The cyclical operation of the apparatus is controlled by a common camshaft (not shown) to produce the synchronised sequence of movements just described.

Although in the present example the frame 16 and associated mechanism is designed to handle three batches 12 of biscuits 11, it will be appreciated that the size of the frame 16 may be modified to enable a smaller or larger number of magazines 10 to be accommodated thereon.

I claim:

1. The combination of an infeed conveyor of a biscuit wrapping machine for conveying successive batches of biscuits along a horizontal path to said machine, a magazine disposed above said conveyor and adapted to contain a vertical column of superposed biscuits, said magazine including a vertically reciprocable bottom support for the biscuits in said column and a horizontally reciprocable pusher operative in timed relationship with the movement of said bottom support to deliver successive batches of biscuits from the magazine, a transfer unit for transferring said delivered batches of biscuits from the magazine to the infeed conveyor, said transfer unit being movable from a loading position adjacent to the magazine to a discharge position above the infeed conveyor and including a frame constituted by a platform which extends horizontally in the loading position to support the bottom of each batch of biscuits delivered from the magazine, a support which extends upwardly from the platform in said loading position to engage the edges of the biscuits in each delivered batch and extends horizontally above the biscuits in said discharge position, a jaw movable into engagement with the top of the batch at the loading position to apply resilient pressure thereto and grippers movable to engage opposite sides of the batch in the central region thereof, means for moving the transfer unit from the loading position to the discharge position in timed relationship with the movements of said bottom support and said pusher, and means for engaging said jaw and said grippers with each batch of biscuits when said transfer unit is in said loading position and for withdrawing said jaw and said grippers simultaneously from the batch when said transfer unit is in the discharge position to allow the batch to fall onto the infeed conveyor.

2. Apparatus according to claim 1, wherein the infeed conveyor has side guides which, when the transfer unit is in the discharge position, are aligned respectively with the inner face of the platform and the inner face of the jaw.

3. Apparatus according to claim 1, which includes springs urging the jaw and the grippers into engagement with the biscuits and power-actuated means for retracting the jaw and the grippers when the transfer unit is in the discharge position.

4. Apparatus according to claim 3, wherein the power-actuated means is constituted by a pneumatic cylinder coupled both to the jaw and to the grippers.

* * * * *